US008452681B2

(12) United States Patent
Clements

(10) Patent No.: US 8,452,681 B2
(45) Date of Patent: May 28, 2013

(54) SYSTEM AND METHOD FOR IMPROVED RATING AND MODELING OF ASSET BACKED SECURITIES

(75) Inventor: Richard F. Clements, Corte Madera, CA (US)

(73) Assignee: Thomson Financial, LLC, New York, NY (US)

( * ) Notice: Subject to any disclaimer, the term of this patent is extended or adjusted under 35 U.S.C. 154(b) by 727 days.

(21) Appl. No.: 12/378,483

(22) Filed: Feb. 13, 2009

(65) Prior Publication Data
US 2010/0211494 A1 Aug. 19, 2010

(51) Int. Cl.
*G06Q 40/00* (2006.01)
(52) U.S. Cl.
CPC ........................ *G06Q 40/00* (2013.01)
USPC .............................. 705/36 R; 705/35; 705/37
(58) Field of Classification Search
None
See application file for complete search history.

(56) References Cited

U.S. PATENT DOCUMENTS

| | | | | |
|---|---|---|---|---|
| 6,078,903 A * | 6/2000 | Kealhofer | ................... | 705/36 R |
| 6,233,566 B1 * | 5/2001 | Levine et al. | ............... | 705/36 R |
| 6,615,187 B1 * | 9/2003 | Ashenmil et al. | ........... | 705/36 R |
| 7,099,843 B1 * | 8/2006 | Cassidy et al. | .................. | 705/38 |
| 7,533,057 B2 * | 5/2009 | Whipple et al. | ................ | 705/38 |
| 7,577,597 B1 * | 8/2009 | Allison et al. | .................. | 705/35 |
| 7,620,595 B1 * | 11/2009 | Holt et al. | ....................... | 705/38 |
| 7,734,523 B1 * | 6/2010 | Cui et al. | .................... | 705/36 R |
| 7,783,562 B1 * | 8/2010 | Ellis | ............................... | 705/38 |
| 7,792,742 B1 * | 9/2010 | Thomas et al. | ................. | 705/38 |
| 7,856,397 B2 * | 12/2010 | Whipple et al. | ................ | 705/38 |
| 7,881,994 B1 * | 2/2011 | An et al. | .......................... | 705/35 |
| 7,933,796 B1 * | 4/2011 | Buist et al. | .................... | 705/7.28 |
| 8,015,091 B1 * | 9/2011 | Ellis | ............................. | 705/36 T |
| 2002/0052766 A1 * | 5/2002 | Dingman et al. | ................. | 705/7 |
| 2002/0116325 A1 * | 8/2002 | Wise et al. | ...................... | 705/38 |
| 2003/0009406 A1 * | 1/2003 | Ross | ................................ | 705/36 |
| 2003/0018558 A1 * | 1/2003 | Heffner et al. | .................. | 705/37 |
| 2003/0135448 A1 * | 7/2003 | Aguias et al. | ................... | 705/38 |
| 2003/0225659 A1 * | 12/2003 | Breeden et al. | ................. | 705/36 |
| 2004/0153330 A1 * | 8/2004 | Miller et al. | ...................... | 705/1 |
| 2004/0158520 A1 * | 8/2004 | Noh | ................................. | 705/38 |
| 2004/0267660 A1 * | 12/2004 | Greenwood et al. | ........... | 705/38 |
| 2005/0144117 A1 * | 6/2005 | Misra et al. | ..................... | 705/38 |

(Continued)

OTHER PUBLICATIONS

Basel and procyclicality: a comparison of the standardised and IRB approaches to an improved credit risk method; Goodhart, Charles; Discussion paper, 524. Financial Markets Group, London School of Economics and Political Science, London, UK; 2004; 25-pages.*

(Continued)

*Primary Examiner* — Gregory Johnson
(74) *Attorney, Agent, or Firm* — Valenti, Hanley & Robinson, PLLC; Kevin T. Duncan

(57) ABSTRACT

The present invention provides a computer-based system for evaluating risk in asset backed securities (ABS) comprising: a database containing data associated with an asset pool of an ABS; a computer having a processor for executing software and being adapted to establish a communication link with an external provider of electronic data and to receive a first data set associated with an asset pool of an ABS, the first data set including credit score data related to the asset pool; and a migratory pattern predictive model application executed by the processor and adapted to analyze at least a part of the first data set, including the credit score data, and to determine a rating concerning the relative risk associated with the ABS.

21 Claims, 7 Drawing Sheets

U.S. PATENT DOCUMENTS

| | | | |
|---|---|---|---|
| 2006/0195391 A1* | 8/2006 | Stanelle | 705/38 |
| 2006/0282360 A1* | 12/2006 | Kahn et al. | 705/35 |
| 2007/0055595 A1* | 3/2007 | Keyes et al. | 705/35 |
| 2007/0061248 A1* | 3/2007 | Shavit et al. | 705/37 |
| 2007/0078744 A1* | 4/2007 | Koss et al. | 705/36 R |
| 2007/0124227 A1* | 5/2007 | Dembo et al. | 705/36 R |
| 2008/0010188 A1* | 1/2008 | Beardsell et al. | 705/38 |
| 2008/0021804 A1* | 1/2008 | Deckoff | 705/36 R |
| 2008/0126267 A1* | 5/2008 | Rosen et al. | 705/36 R |
| 2008/0133427 A1* | 6/2008 | Watson et al. | 705/36 R |
| 2008/0249809 A1 | 10/2008 | Rosen et al. | |
| 2009/0024539 A1* | 1/2009 | Decker | 705/36 R |
| 2009/0030852 A1 | 1/2009 | Braun et al. | |
| 2009/0240609 A1* | 9/2009 | Cho et al. | 705/30 |
| 2009/0276234 A1* | 11/2009 | Metz | 705/1 |
| 2010/0153299 A1* | 6/2010 | Keenan et al. | 705/36 R |
| 2011/0016042 A1* | 1/2011 | Cho et al. | 705/38 |

OTHER PUBLICATIONS

The credit risk in SME loans portfolios: Modeling issues, pricing, and capital requirements; Michel Dietsch; Journal of Banking & Finance; 2002; 20-pages.*

The effects of estimation error on measures of portfolio credit risk; Gunter Loffler; Journal of Banking & Finance; 2003; 27-pages.*

Debt Rating Migration ASD the Valuation of Commercial Loans; Alex Ginzburg; via Google search; 47-pages.*

* cited by examiner

SYSTEM AND METHOD FOR IMPROVED RATING AND MODELING OF ASSET BACKED SECURITIES

FIELD OF THE INVENTION

The invention relates generally to structured securitized products, such as asset backed securities. In particular, the invention relates to databases and financial risk models executing on computer systems for evaluating and managing collateral security for a portfolio of loan obligations related to structured securitized products, such as asset backed securities.

BACKGROUND

In financial markets participants buy and sell debt securities, usually in the form of bonds. The Securities Industry and Financial Markets Association (SIFMA), classifies the bond market into sub-markets, including asset backed securities (ABS), which includes mortgage backed securities (MBS), residential mortgage backed securities (RMBS), commercial mortgage backed securities (CMBS), other ABS which includes securities backed by student loans, automobile loans and credit card loans and collateralized debt obligation (CDO) securities. The present invention is concerned primarily with the ABS market.

For decades a succession of legislative and regulatory enactments, as well as market-driven initiatives, have provided the fuel for rapid growth of the housing market in the U.S., which has transformed from a fragmented and inefficient system to a liquid and vibrant market. The result is a housing market that has grown markedly from a liquidity-starved system to one in which liquidity is abundant. Initiatives undertaken by numerous market participants include actions to standardize the origination and securitization of home mortgages. The evolution of primary and secondary mortgage markets has made mortgage credit widely available and at lower costs to borrowers. In addition, funding efficiencies have benefited issuers and increased choices have benefited investors in fixed-income products. Also, over the last several decades consumer credit has become increasingly available. The growth of financial liquidity has led to evolvement of a wide variety of structured products to promote and facilitate the extension and use of credit, home ownership, and the profits that go along with providing such financing. However, the result of over-extension of credit, predatory lending, moral hazards in the system, and associated defaults has caused the U.S. government, regulatory agencies, and the financial industry to revisit, rethink and re-engineer credit and lending policies and structures to avoid further damage to the market and economy.

The following provides a background of the processes associated with the ABS securities market. Generally, securitization refers to a structured finance process in which cash-flow producing financial assets are pooled and repackaged as a portfolio into securities that are sold to investors. ABSs are a debt-based security based on pools of assets or collateralized by cash-flows from an asset pool. Because the credit quality or rating of securitized assets associated with cash-flow is ever changing due to time and structure-dependent volatility, this type of security has an inherent risk to the structure. Advantages of pooling assets in this manner include making investing in such types of debt worthwhile and to a broader range of investors, and reducing the risk of such investment by diversifying the underlying pooled assets. Pooled assets can include receivables related cash-flows, such as credit card payments, student loans, auto loans, and mortgages, aircraft leases, royalty payments and movie revenues. An additional benefit to this type of security is credit enhancement that results from creating a security with a higher rating than the issuing company which monetizes its assets resulting in a lower rate of interest than associated with a secured bank loan or debt issuance.

Mortgage-backed securities (MBS), including residential MBS (RMBS), are ABSs backed by a pool of mortgage loans and collateralized with principal and interest payment cash-flow. Typical residential mortgages allow for payment over and above the fixed monthly payment, including even the complete retirement of the remaining debt. This advancement or prepayment has the effect of altering the principal on the loan and on the monthly cash flow of an MBS and is a variable over time that presents a risk to the structure of the MBS and to its investors.

Collateralized debt obligations (CDOs) are a type of ABS and structured credit product. CDOs are constructed from a portfolio of fixed-income assets. CDOs are divided by the issuer into different tranches: senior tranches (rated AAA), mezzanine tranches (AA to BB), and equity tranches (unrated). Losses are applied in reverse order of seniority and so junior tranches offer higher coupons (interest rates) to compensate for the added default risk. Since 1987, CDOs have become an important funding vehicle for fixed-income assets.

The recent credit crunch has confirmed that the widespread reliance on ABSs pose great risk to financial markets due to a fundamental flaw that causes all tranches to be extremely high risk for investors. One of the problems with ABSs in general is that loan originators retain no residual risk associated with the loans they make, and that make up the pool of assets in ABSs, but collect substantial fees in issuing the loans. This imbalance in risk/reward has resulted in the degradation of underwriting standards as the risk is passed down the line. This fundamental structural flaw in the debt-securitization market is one of the direct causes of both the credit "bubble", credit crisis, and banking crisis of this decade. Adding to the problem was the failure of credit rating agencies to account for the degradation in underwriting standards when evaluating the structure and value of ABS products, as well as not modeling for the severe downturn in the housing market which makes up the collateral for the RMBS market, which saw the highest level of subprime and Alt-a mortgage securitization in history by both volume and percentage of the overall markets. Like a row of dominoes falling, investors buying ABSs, unable to independently gauge ABS structure and performance, relied on these exaggerated ratings. The collapse of the financial market has caused investors to lose confidence in the integrity of ratings agencies, and the ratings they assign. These recent, well documented problems in the credit markets have revealed the need for better transparency and information in the Structured Finance arena. A clear need exists for access to more and better information and for using that information to add integrity to the ratings process to enhance investor confidence in the credit markets.

One organization that is involved in exploring ways to address the current market needs is The American Securitization Forum ("ASF"), a subsidiary of SIFMA. ASF recently announced the launch of its Project on Residential Securitization Transparency and Reporting ("RESTART") with the stated goal of restoring investor confidence in mortgage and asset-backed securities. ASF believes this will restore institutional investor capital to securitization markets and ultimately will increase the supply and lower the cost of mortgage and consumer credit. To this end, ASF has identified areas of improvement in the process of securitization and refashion, in a comprehensive and integrated format, the critical aspects of securitization with market-based solutions and expectations. RESTART has been divided into phases that are sequenced for release and implementation through 2009. The initial focus of RESTART is on the private-label residential mortgage-backed securities ("RMBS") market with similar efforts to be pursued in other major asset classes such as student loan, credit card and automobile securitizations. ASF published a document detailing RESTART, entitled ASF Project RESTART, at its website (http://www.americansecuritization.com/uploadedFiles/Project_RESTART_RFC_%207_16_%2008.pdf). This document is referred to hereinbelow and is hereby incorporated by reference.

The first major component of RESTART released was the RMBS Disclosure Package. ASF stated that key goals of the effort are transparency, disclosure and diligence. The RMBS Disclosure Package included in the RESTART release document reflects the focus on developing specific and detailed market standards and practices that, through market-imposed incentives and discipline, will result in their implementation by all applicable industry participants.

According to ASF, an important factor in the success of the residential mortgage-backed securities markets has been the standardization of terms and the transparency of information available to parties taking, assessing or distributing risk. Capital commitment decisions by loan originators, financial intermediaries and fixed-income investors, as well as risk assessments by rating agencies, should be made with as much consistent disclosure as is cost-effective. Moreover, it is also critically important that this information be comparable across issuers and servicers without unnecessary and inefficient 'normalization' by transaction parties, particularly institutional investors. Limitations on lender's balance sheets and capital constraints make the need to restart the mortgage securitization markets great. However, successful restoration of the credit market will require providing institutional investors, who are mostly at risk credit risk of mortgage loan defaults, with more information about and more confidence in the origination process and in the ongoing soundness of a securities structure.

Project RESTART included the development of standardized data fields that would add to the transparency and disclosure of information to market participants. Two aspects proposed in the initial phases of the Project RESTART include: ASF RMBS Disclosure Package and ASF RMBS Reporting Package. RMBS Disclosure Package is a proposed disclosure package to (1) provide more data than currently available to institutional investors, rating agencies and other eligible RMBS market participants about the underlying mortgage loans, (2) standardize the presentation of deal and loan-level data to allow investors to easily compare loans and transactions across all issuers and (3) allow investors to perform necessary and sufficient deal and loan-level analysis in order to evaluate RMBS transactions on the basis of the credit quality of the underlying mortgage loans. RMBS Reporting Package is a dynamic set of data elements derived from the RMBS Disclosure Package that can be updated by servicers on a monthly basis throughout the life of an RMBS transaction and made available to investors and rating agencies through trustee or servicer investor reporting websites and other third party information providers. The RMBS Reporting Package will allow investors and rating agencies to compare updated data files across issuers and to track the performance of a mortgage loan throughout its life in the secondary market.

SUMMARY OF THE INVENTION

The present invention is directed to helping restore confidence in data utilized by structured finance professionals, including rating agencies and investors, by providing a system for monitoring and updating data related to collateral value and credit ratings of borrowers comprising underlying assets of a security to reflect updated information useful for processing by financial models used to rate investments. For example, when a security, such as an ABS, is first rated, security risks associated with each borrower of loans comprising the asset pool of the security are considered. For example, the respective credit ratings of the pool of borrowers may be analyzed discretely or in composite fashion. However, because assets, such as mortgages, may be paid down or paid off altogether, over time the overall composition, and concurrent risk, of the pool of borrowers may change thereby change the risk of the investment. For example, a disproportionate number of borrowers with high credit ratings may leave the pool over time resulting in a degradation of the security due to increased risks of defaults associated with the remaining borrowers with relatively lower credit ratings, however the stability of this security if the remaining borrowers credit score have not been downgraded is not taken into account. This would have the effect of increasing the risk of the security and, if all else remains the same, lowering the rating of the security. Presently, this adjustment over time to reflect the change in condition is not available to investors or to rating agencies. By removing such uncertainties and known inaccuracies the present invention has the effect of boosting confidence in the market and therefore the effect of promoting investment and therefore liquidity in the market.

The invention provides migratory data or patterns associated with asset pools over time to reflect changing conditions, risks, and ratings of securities. Also, the invention may use the migratory pattern data to anticipate changes over time given a present composition of an asset pool. For instance, certain types of asset pools, credit card receivables, mortgages, auto loans, etc., may behave in a predictive way. By periodically collecting updated data associated with underlying assets that make up a pool and comparing the changes over time and by applying predictive techniques and algorithms, a user of the invention may better be able to predict risks over the projected life of a security and therefore be able to more accurately rate or otherwise evaluate the quality or desirability of the security. Also, the data collected by the methods of the invention may be packaged and supplied to interested concerns, such as investment banks, rating agencies, and investors, for use in predictive models associated with the invention or in predictive models established by such entities as variations of those expressed herein.

The invention provides the marketplace with better in-depth analysis, as well as looking for potential partnerships and acquisitions. This invention provides a drill down solution and allows users to drill up into rolled up structures offering better transparency. The invention tracks recourse for purchasers of newly securitized instruments, which will lead to more aggressive models for pricing of securities and derivative products providing enhanced value to sell-side and buy-side participants.

The invention provides a method and system for determining FICO Score Migration and migration of any other individual credit measure associated in a pool migratory pattern. The current marketplace is calling for greater transparency in the structured finance marketplace. The advent of FICO migration and the application of Fair Isaac's or any other individual credit measure associated in a pool migratory pattern provides much greater transparency and better calculation of Loss Given Default (LGD) and Probability of Default (PD) in pools of loans. Likewise, this applies to VantageScore and other credit scores.

FICO and Vantage migration patterns refers to the problem of not having updated Weighted Average FICO Scores for seasoned pools available for consideration in rating or otherwise evaluating structured products. The current market conditions are calling for greater visibility and transparency in risk profiles to better assess the pricing of individual securities in MBS portfolios. The models used in pricing these securities assumed that home prices would increase allowing for borrower to refinance their mortgages. As home prices have fallen dramatically there is a call for better transparency and therefore better pricing.

The invention provides a solution to this problem by creating Periodic, e.g., annual, monthly, bi-annual, or semi-annual, FICO and Vantage score patterns for U.S. RMBS Securities. Preferably, the updated Vantage and FICO score pattern data will make the following information available to rating agencies and investors: Updated Weighted Average FICO Scores; and Migratory patterns available for Loan Pools in RMBS. This data aggregated on an historical basis will provide the migration patterns for the pools, allowing for trends to be established, thereby establishing more sophisticated data sets enabling better analysis of PDs and LGDs.

An additional aspect of the present invention concerns international data standardization. The problem is that the current market is looking for standardization and normalization with regards to loan level data in the Residential Mortgage Market. There is no way currently for investors to compare issues from different regions. The present invention addresses the problem by proposing establishment of a global scoring standard. This solution would enable asset managers to analyze cross border credit in a standardized format to help restore confidence in the structured marketplace.

In a first embodiment, the invention provides a computer-implemented method comprising: (a) identifying an asset backed security (ABS); (b) assigning a first score to the ABS at a first time; (c) based upon a migratory pattern associated with the ABS, assigning a second score to the ABS at a second time; and (d) storing the second score. The invention may further be characterized by the migratory pattern being based upon at least one factor selected from the group consisting of: (a) a set of credit scores; (b) a set of credit capacity indices; (c) a set of loan-to=value (LTV) ratios; (d) a set of information relating to home sales; (e) a set of information relating to home foreclosures; and (f) a set of information relating to HELOCs.

In another embodiment the invention provides a computerized method for evaluating risk in asset backed securities, the method comprising: receiving a first data set associated with an asset pool of an asset backed security (ABS), the first data set including credit score data related to the asset pool; applying a migratory pattern predictive model to at least a part of the first data set, including the credit score data, and determining a rating concerning the relative risk associated with the ABS.

In another embodiment the invention provides a computer-based system for evaluating risk in asset backed securities (ABS) comprising: a database containing data associated with an asset pool of an ABS; a computer having a processor for executing software and being adapted to establish a communication link with an external provider of electronic data and to receive a first data set associated with an asset pool of an ABS, the first data set including credit score data related to the asset pool; and a migratory pattern predictive model application executed by the processor and adapted to analyze at least a part of the first data set, including the credit score data, and to determine a rating concerning the relative risk associated with the ABS.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
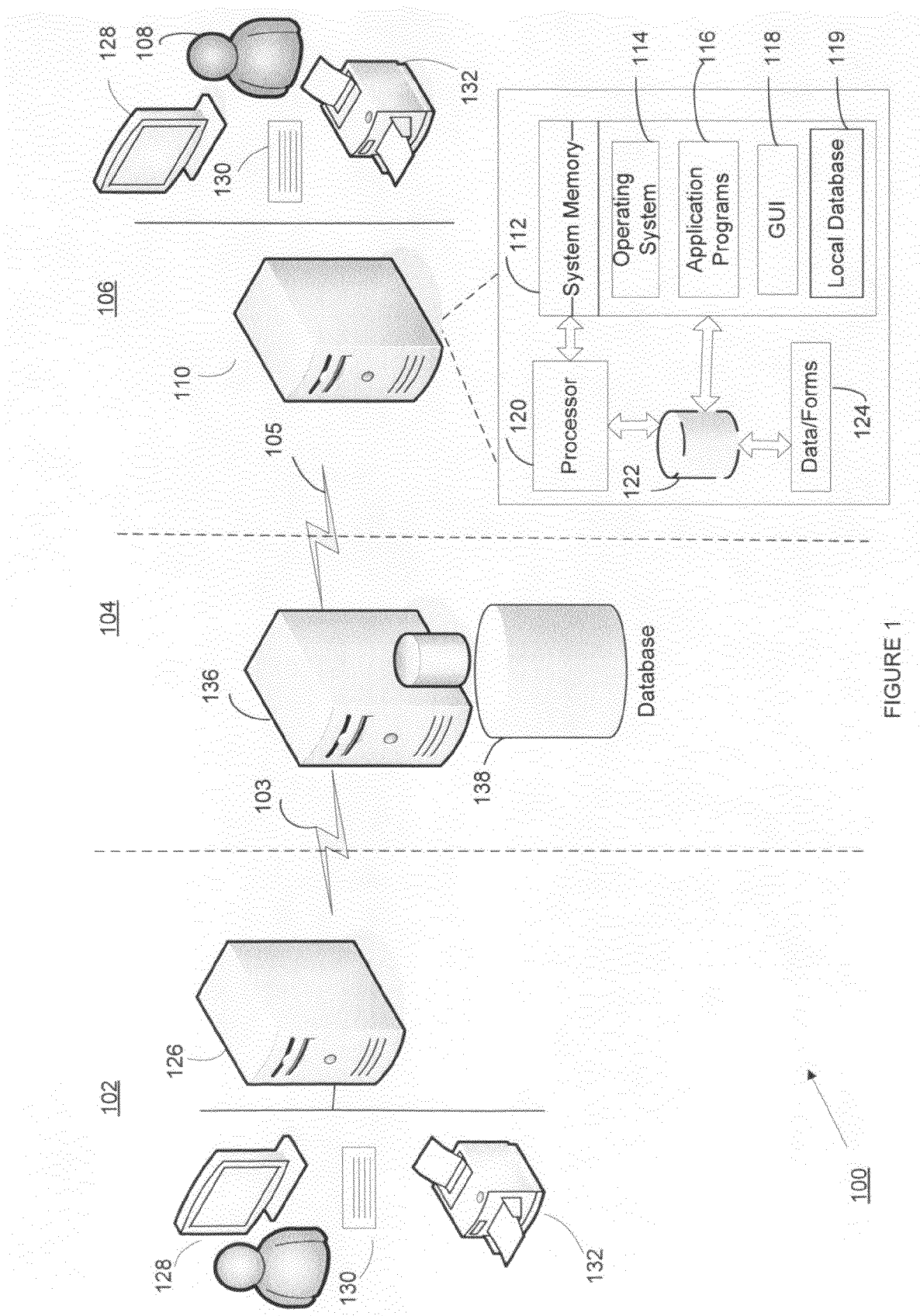
FIG. 1 is a schematic representation of an exemplary embodiment of a system architecture for interfacing and data transfer between a financial data service provider and a financial institution computer system in accordance with the present invention.

Referring now to FIG. 1, a client/server communication system 100 is shown for implementing the Securitized Asset Data Service (SADS) and associated software that provides an effective flow of securitized asset data and other business data and records to/from third-party data provider 102, client system 106 and primary data provider 104, having a central server 136 and database 138, including a Genealogical Structured Instrument Database (SID). The SADS is preferably browser-based and may include one or more of application programs, example of which include client-side cookie, routine or applet, 116, available to or stored on the computer 110 at client 106, for example. The client system 106 may be within an organization, such as a structured product investor entity or a ratings agency entity. In this example, a user 108, such as an structured product ratings professional responsible for evaluating and assign a rating to a structured product, such as an RMBS, may access the SADS operating at the central server 136 so as to receive financial data, including data stored at database 138, and including asset pool migratory pattern related information. Communication links 103 and 105 with the central server system 104 are established respectively with third-party data provider 102 and client system 106. This configuration is one of many and is not limiting as to the invention.

Also, client 106 may use self-contained applications within a desktop or server or network environment and may utilize a local database 119, such as SQL 2005 or above or SQL Express or other suitable database, to store client data and records, which may then be uploaded to database 138 via communication link 105 or shared with users of the SADS via email or the like. Ratings agencies, for example client user 108, have financial models that are stored locally at client 106, for example in memory 116, and that may be executed such as on processor 120 of computer 110 and displayed on monitor 128. In addition, modeling software may be accessed via server 136 for execution on client computer 110 such as, for example, by download or by browser-based user interface via communication link 105.

Any of several suitable communication links are available, such as one or a combination of wireless, LAN, WLAN, ISDN, X.25, DSL, and ATM type networks, for example. The communication links 103 and 105 are preferably secure such as by using encryption techniques. In addition, highly sensitive data may be transferred to client 106 by any other suitable means to ensure security and effectiveness of delivery of data. The client system computers may comprise a typical combination of hardware and software including, as shown in respect to computer 110, system memory 112, operating system 114, application programs 116, graphical user interface (GUI) 118, processor 120, and storage 122 which may contain electronic information 124 such as data records, transactions, data, procedures and the like. The operating system 114 should be suitable for use with the SADS and browser functionality described herein, for example, Microsoft Windows Vista (business, enterprise and ultimate editions), or Windows XP Professional with SP2. Also, the SADS and associated software may include custom integration with Adobe Acrobat applications, scanning software, and Microsoft Office applications, e.g., Outlook, Word and Excel. Application programs 116 may include, for example, Adobe Acrobat, Microsoft Office 2007, Office XP, or Office 2003. The system requirements in one embodiment may require the client machines to be compatible with minimum threshold levels of processing capabilities, e.g., Intel Pentium III, speed, e.g., 500 MHz, and other parameters.

For purposes of discussion, an exemplary third-party data provider system 102 may comprise a computer 126, user interface peripherals such as drives (not shown), monitor 128, keyboard 130, and printer 132. The computer 126 may include or be connected to a database of data related to securitized assets, ABSs, borrowers, lenders, credit scoring entities (e.g., FICO, Experian, Transunion, and Equifax), investment banks, rating agencies, government agencies or authorities, or any other entity that has information useful in evaluating a security or underlying assets of a security. The computer 126 may be used to communicate remotely, such as via the Internet, with the SADS central server 136 and may load, pass, receive information, instructions, data, forms, procedures and the like for storing and using locally. The third-party system 102 is but one of potentially many such data providers, all of which may deliver data to central server 136, and may include a network of computers, such as over a LAN, WLAN, Ethernet, token ring, FDDI ring or other communications network infrastructure. Although not shown, third-party data provider may also have a similar communication link with client system 106, and may by that link, or by other means, communicate data related to asset backed securities and the underlying assets directly to such client systems.

Aspects of the system 100 may be enabled using any combination of Internet or (World Wide) WEB-based, private virtual network, ethernet, etc., and may be desktop-based, or application WEB-enabled.

SADS collects data, such as from third-party data providers 102, and monitors and updates securitized asset data related to asset backed securities and stores such data at SID 138. For instance, over time securitized asset data, such as collateral value and credit ratings of borrowers of underlying assets comprising the pool of assets of a security, changes and the overall risk and desirability of the structured product changes. SADS may use parameters determined to be predictive in nature and process related data to model behavior. SADS may employ modeling routines or the like, or such may be executed by client computers, to process the collected, and perhaps other, data to evaluate, rate or otherwise scrutinize securities. The data collected and stored in SID 138 may be provided to client systems 106, such as via communication link 105, for further processing by financial models local to client system(s) 106 and used to rate and evaluate investments.

SADS monitors the asset pool and collects updated dated related to assets that make up the pool and applies the updated data or otherwise applies the changes in the data to reevaluate the product. For instance, a user may use SADS to calculate a new rating for the security based on the changed data or the financial service provider 104 may provide the collected information to interested parties who apply SADS techniques to reevaluate the security. The data, such as FICO score data, may be gathered from a plurality of sources, such as via communication link 103 from third-party data service providers 102, and may be stored at SID 138. The identification of key predictive parameters and processing of data for modeling may be executed at central server 136 of primary data provider 104, for example, or the central server may provide the collected data or some packaging of such data to a client 106. The client 106 may then process the data such as by using modeling algorithms and techniques. For instance, the client 106 may be a rating agency that processes the data by a modeling program executing at computer 110 that may result in a lowering of the rating of the security.

Figure 3:
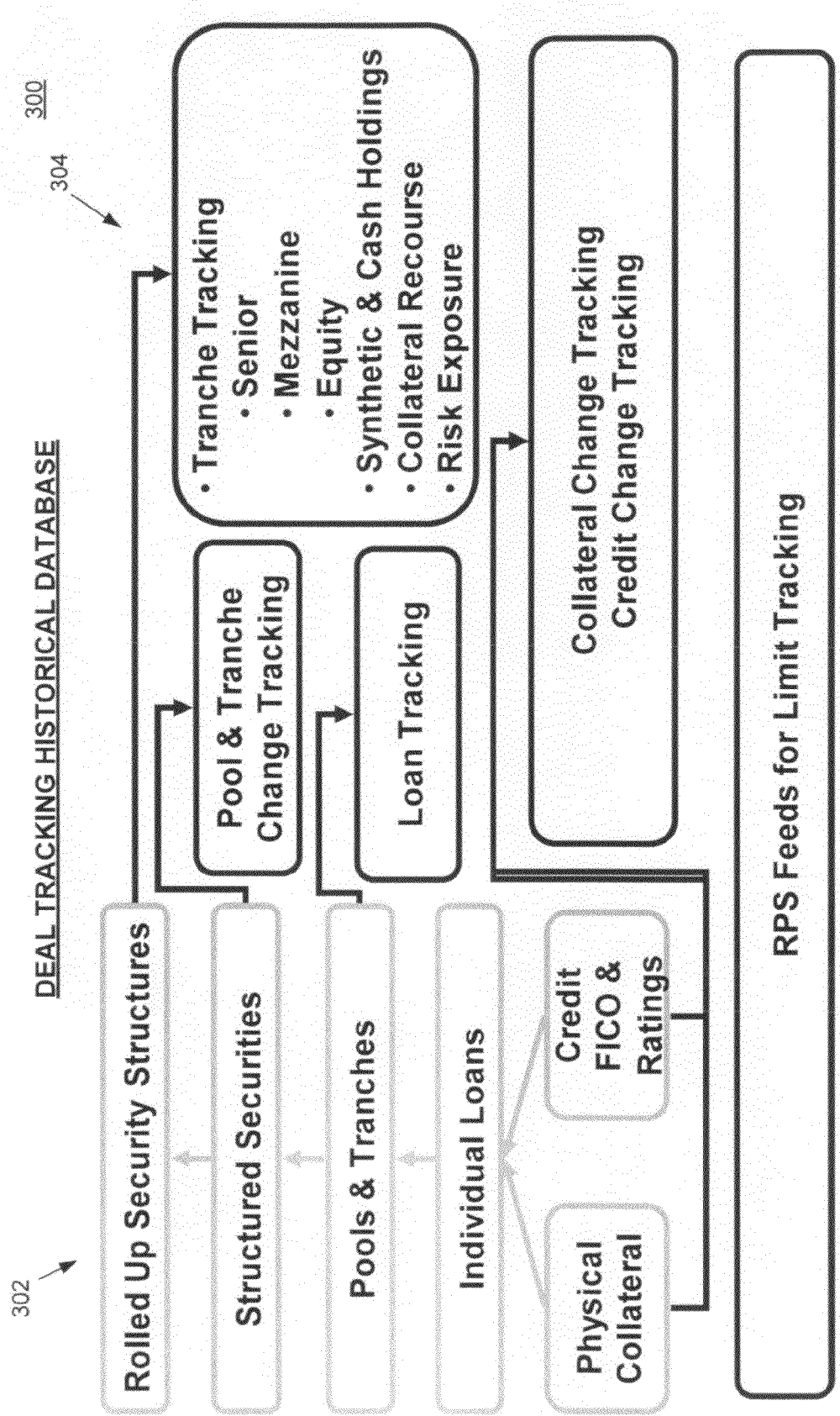
FIG. 3 is a schematic representation of a securitized product deal tracking historical database associated with the present invention.
Figure 4:
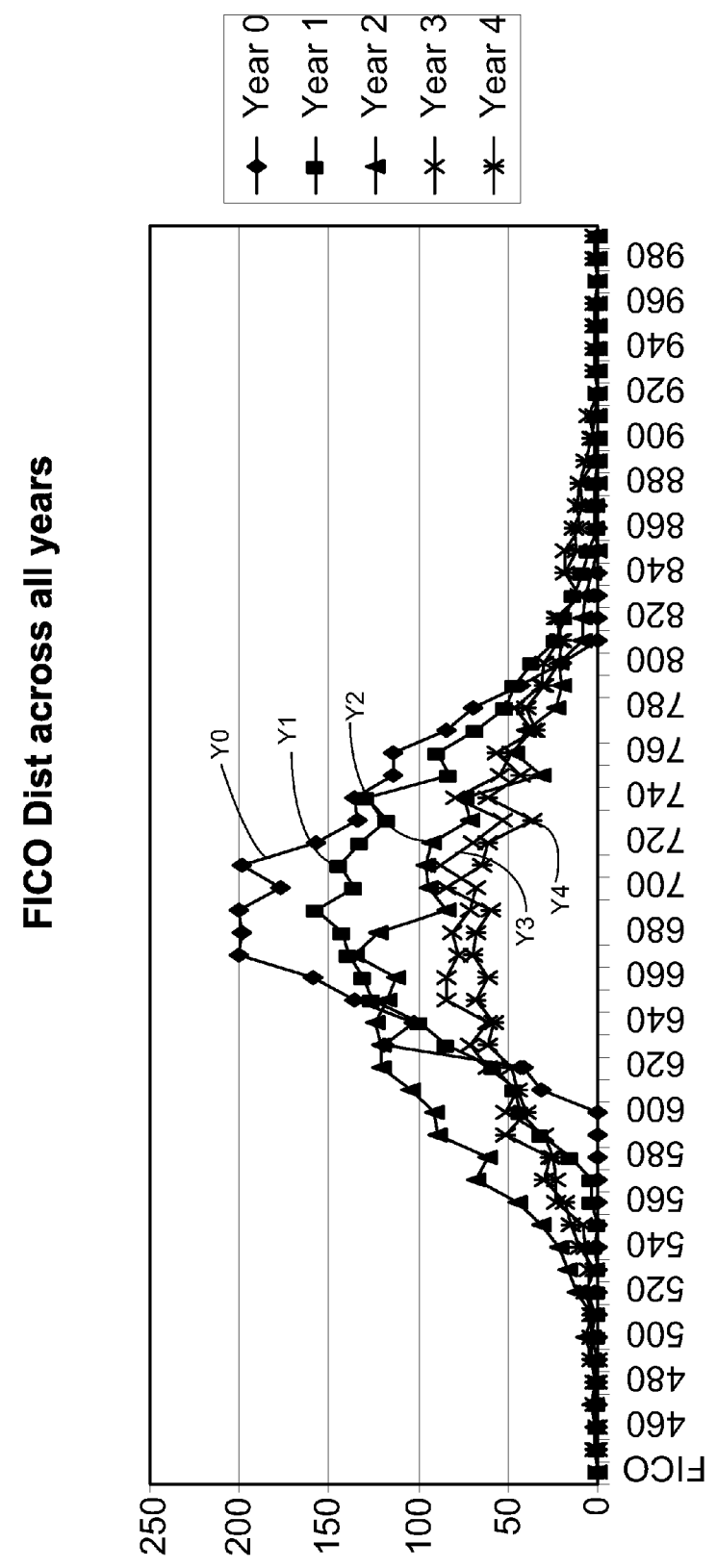
FIG. 4 is a FICO score distribution graph associated with one exemplary implementation of the present invention.

SADS includes a migratory determination module, functionally represented at 304 of FIG. 3, that processes securitized asset data to determine changes in the asset pools of ABSs and that determines patterns associated with asset pools over time that reflect changing conditions, risks, and ratings of securities. Also, the migratory pattern data and algorithms may be used in a predictive manner to anticipate changes over time given a present composition and set of parameters of an asset pool. For instance, certain types of asset pools, credit card receivables, mortgages, auto loans, etc., may behave in a uniquely predictive way. By periodically collecting updated data associated with underlying assets that make up a pool and comparing the changes over time and by applying predictive techniques and algorithms, a user of the invention may better be able to predict risks over the projected life of a security and therefore be able to more accurately rate or otherwise evaluate the quality or desirability of the security. Also, the data collected by the methods of the invention may be packaged and supplied to interested concerns, such as investment banks, rating agencies, and investors, for use in predictive models associated with the invention or in predictive models established by such entities as variations of those expressed herein or of their own making. In one manner, SADS may be used to process data to generate a revised or updated score that can be supplied to interested parties much as a FICO score is provided. In the alternative, SADS migratory scoring model may be provided to clients, who may then develop their own proprietary models based on the SADS model.

SADS includes a structured instrument database (SID) for Mortgage Backed and Asset Backed Securities and superstructures, such as CDOs, CDO2s and CDO3s. SADS and SID database will allow users to drill down to the loan level details including changes in collateral values and credit scores that may affect rating and structure of the security. The SID database may be accessed from an enterprise or desktop level, and may feed one or more financial provider services, e.g., the Thomson Reuters Pricing Service which currently prices over 1.33 million fixed income securities daily including pools.

SADS is intended for use in monitoring and maintaining ratings associated with a wide variety of structured products, including Mortgage Backed Securities (MBS), Asset Backed Securities (ABS), and Collateralized Debt Obligations (CDO). Mortgage Backed Securities (MBS) include: Collateralized Mortgage Obligations (CMOs), including Whole Loan CMOs, Residential Mortgage Backed Securities (RMBS) and Commercial Mortgage Backed Securities (CMBS); and Mortgage Backed Securities, including Agency Backed (GNMA, FNMA, FHLMC). Asset Backed Securities (ABS) include the following types: Asset Backed Tranches; Auto Floorplan/Wholesale Loans; Auto Lease Loans; Credit Cards; Equipment Backed; Home Equity Lines of Credit (HELOC); Manufactured Housing Loan; Marine Backed; Recreational Vehicle Loans; and Student Loans. Collateralized Debt Obligations include the following types: Collateralized Bond Obligations—CDOs backed primarily by corporate bonds; Collateralized Loan Obligations (CLOs); Collateralized synthetic obligations—CDOs backed primarily by credit derivatives; Commercial real estate CDOs—CDOs backed primarily by commercial real estate assets; Structured Finance CDO—CDOs backed primarily by structured products such as ABSs and MBSs. In addition, the invention may be used with the following types of asset backed securities: Cash CDO—typically owns assets; Synthetic CDO—Credit Default Swaps (CDS) exposure; Hybrid CDO; Structured Finance CDOs (SFCDOs); CDO Squared—made up of CDOs; CDO Cubed—made up of CDOs and CDO Squared; and Structured Investment Vehicles. The specification includes descriptions and embodiments that refer to particular ones of the structured products listed above but it should be clear to one of ordinary skill in the art to apply the invention across the wide range of structured products and the exemplary descriptions offered herein do not limit the invention to any particular application of the invention to any particular structured product.

ABSs collateralized by home equity loans (HELs) represent the largest asset class and typically are non-agency loans and include second lien subprime mortgages, first-lien loans, high LTV loans, re-performing loans, scratch and dent loans, or open-ended home equity lines of credit (HELOC). Subprime mortgage borrowers typically have lower credit scores that result in loans with higher than average interest rates.

ABSs collateralized by auto loans represent the second largest class in the ABS market. Auto finance companies issue securities backed by underlying pools of auto-related loans and are classified into three categories: prime, nonprime, and subprime. Prime auto ABSs are collateralized by loans made to borrowers with strong credit scores or histories with non-prime and sub-prime loans being made to borrowers having lower credit scores and/or tainted credited histories.

ABSs backed by credit card receivables are based on borrowers' principal and interest payments as the collateralized cash-flow. ABS backed by credit card receivables are issued out of trusts that have a fixed or static pool of receivables that are tranched into senior/subordinated bonds or out of a master or delinked trust, which allow investors to benefit from a larger pool of loans made over time rather than one static pool.

A CDO is an entity-based construct to hold assets as collateral and to sell packages of cash-flows to investors, who then have an interest in the CDO entity, with defined risk and reward, but not directly in the underlying collateralized assets. Accordingly, the investment, and the confidence of the investor in making the investment, depends on the integrity of ratings, metrics, and assumptions used to define the risk/reward of the tranches. As with all ABSs, CDOs present an unbalanced risk/reward relationship between originators, who earn fees from securitizing the loans without bearing residual risks, and investors who do bear the risk of the CDO. An investment in a CDO is based upon the cash-flows of the underlying assets, and the representations, metrics and financial models of the investment bank or underwriter. It is not a direct investment in the underlying collateralized assets such as in the case of a MBS. Losses are applied in reverse order of seniority (i.e., highest credit risk tranches to lowest) and therefore the more senior, more protected tranches are the higher rated tranches.

Changes in collateral, the underlying assets that make up the asset pool, have an extreme effect on structured products as evidenced by the financial market collapse of the late-2000s. SADS tracks changes in physical collateral and tracks changes to the value of the underlying collateral, such as property values, interest rates, principal balance, etc. Collecting, processing and disseminating, such as through a financial service provider service, a multitude of data from different sources will provide the participants in the financial markets, including rating agencies and investors, with the best most up to date information possible to evaluate securities, assign ratings to such securities, and make sound, informed and confident investment decisions.

Almost always, the loan process includes colleting credit data at loan inception, this credit data includes applicant credit reports and credit scores. A credit score is an underwriting tool available to lenders that represents a statistical analysis of a person's credit report. It is used to "score" the creditworthiness of that person, i.e., the likelihood of a person to pay his debts, and to avoid losses, or at least avoid unacceptably high potential for losses, due to bad debt. Three major credit bureaus (Equifax, Experian, and TransUnion) issue credit reports that include a credit score. Each bureau may have different credit information for each person, and apply a slightly different proprietary credit scoring model. Although the Fair Isaac Corporation develops credit score versions for the different agencies, they are different formulas that result in different numbers. However, each of the credit scoring versions are derived from the Fair Isaac Risk Model engine. These scores are periodically updated to reflect current consumer loan repayment rates. Many lenders use Fair Isaac's FICO scoring model when evaluating a borrower's creditworthiness. Lenders use credit scores not only to determine qualification for a loan, but for what type of loan, at what interest rate, and, where appropriate, to what credit limits. For consistency, the three major credit bureaus collectively introduced the VantageScore scoring model, although scores may still differ from agency to agency due to differences in data used by each in processing the model. Other credit scores include NextGen and the Community Empower CE Score.

SADS provides an updated matrix of credit rating changes to structured products. Included in this updated matrix may be changes in composite, mean, average, median credit scores of borrowers associated with the underlying assets. SADS also provides updates related to pay downs, loan pay offs, and also collateral value changes, for example to reflect property value fluctuation. A common misconception or faulty premise that has led to many defaults and risky investments is the premise that property values will generally increase and only suffer minor isolated decreases. This has been proven to be a flaw with accurately rating risk and especially for ABSs whose cash-flows and asset pool composition changes over time. SADS harnesses these changes and brings them to bear in monitoring the level of risk of ABSs by contracting with a number of different data sources and either directly processing the updated information or providing a way for client end users to select data from a packaged set or sets to choose the data the user feels most accurately depicts market activity and change in risk. Users apply the selected data to their respective risk models to formulate a score or rating or other mechanism for evaluation.

SADS includes software adapted to provide quantitative analysis along with different analytics tools in order to best quantify and price structured market products. As many market participants currently apply in-house proprietary modeling and analysis, Reuters will add to these models and provide basis calculations from a number of different sources The SID database offers full transparency on a drill up or drill down basis as well as housing and offering full historical data sets for the life of each structure. The advantages of the system include: Overall structure and constituents; Full vertical visibility from any point; Better pricing from loan, pool, tranche, security or senior structured product; Historical and dynamic loan level detail (including: Collateral pricing and Credit Scoring); Direct recourse visibility; Collateral recourse levels; Superior price modeling; and Ownership rights. Each of the data points in the data base will be updated accordingly: Pricing—Daily; Credit—Monthly; Collateral Constituents—Monthly; and Collateral Pricing—Quarterly.

The SID 138 is adapted to collect and repackage data that provides the following: loan level detail including collateral and credit detail and changes; full vertical visibility from any point; better pricing from loan, pool, tranche, security or senior structured product; and recourse visibility. SADS provides superior visibility & transparency, including overall structure and constituents; collateral recourse levels superior price modeling, and ownership rights. SADS provides a recourse services aspect including: full collateral views; in-depth collateral views; changes in individual collateral; and changes in collateral values. In addition, SADS provides default recourse services (registration) including: investor representation created at the inception level; single source representation for all parties involved: investors, issuers etc.; and decrease term to collateral recovery for hard asset collateral.

SADS provides granular loan level data in order for customers to better: manage risk, and mark-to-model for structured instruments. SADS provides users such as structured finance instrument stake holders a way to adapt to changing market conditions by maximizing data points for modeling, and providing better data transparency in the marketplace. SADS is applicable to: originators, rating agencies, monoline insurance companies, asset managers, sell-side institutions, government-sponsored entities and regulators, risk managers, portfolio managers; traders, and quantitative analysts.

Figure 2:
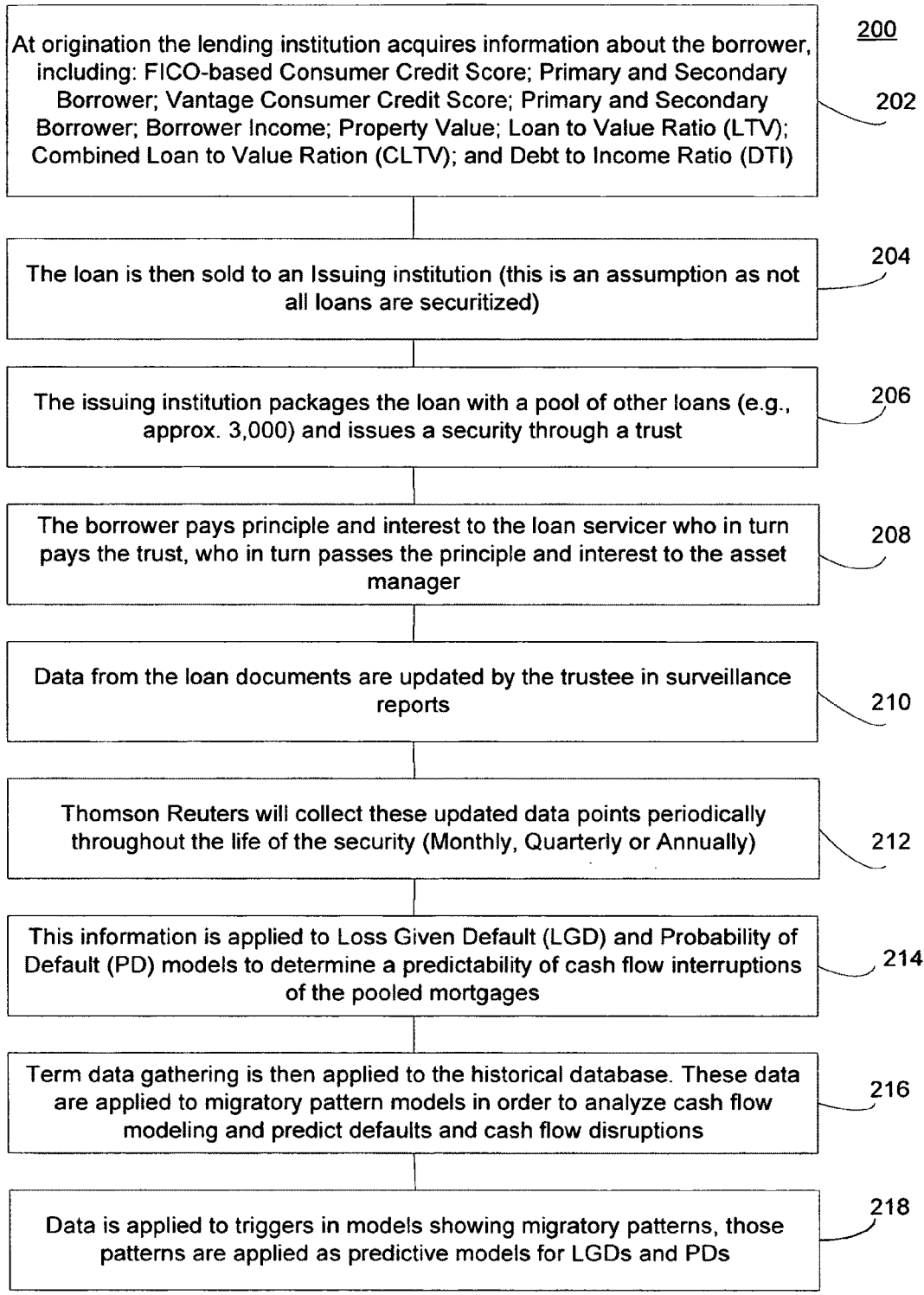
FIG. 2 is a flow chart representing an exemplary process associated with implementing the processing and exchange of data in accordance with the present invention.

Now with reference to FIG. 2, one exemplary embodiment is shown as a flow process 200. At step 202, a lending institution at origination acquires information about a borrower/applicant. Key examples of data collected are: Fair Isaac Credit Score—FICO Score—Consumer Credit Score; Primary and Secondary Borrower; Vantage Score—Consumer Credit Score; Primary and Secondary Borrower; Borrower Income; Property Value; Loan to Value Ratio (LTV); Combined Loan to Value Ration (CLTV); and Debt to Income Ratio (DTI). At step 204, an approved and processed loan is then sold to an Issuing institution (this is an assumption for purposes of this example as not all loans are securitized). At step 206, the issuing institution packages the loan with a pool of other loans (e.g., approximately 3,000 loans) and issues a security through a trust. At step 208, the borrower pays principle and interest to the loan servicer who in turn pays the trust. Then the trust passes the principle and interest to the asset manager. At step 210, data from the loan documents are updated by the trustee in surveillance reports. Presently in today's environment, these data do not include updated Consumer Credit Reports. However, with the efforts of ASF, as discussed above, and others, greater transparency and availability of data will make this data more readily available—at least in some usable form. At step 212, a primary financial data service provider, such as Thomson Reuters Corporation, collects these updated data points periodically (e.g., weekly, monthly, quarterly or annually) throughout the life of the security. At step 214, the collected updated information is applied to Loss Given Default (LGD) and Probability of Default (PD) models to determine a predictability of cash-flow interruptions of the pooled mortgages. At step 216, term data gathering is then applied to the historical database. These data are applied to migratory pattern models in order to analyze cash-flow modeling and predict defaults and cash-flow disruptions. At step 218, data is applied to triggers in models showing migratory patterns, those patterns are applied as predictive models for LGDs and PDs.

When a security, such as an ABS, is first rated, security risks or credit ratings, such as FICO and Vantage scores, associated with each borrower of loans comprising the asset pool of the security may be considered or factored into a rating. Although in the examples provided herein specific reference may be made to a particular credit score, e.g., FICO, it should be understood that this is not limiting as to the invention as the invention relates generally to credit scores and would apply to others, e.g., VantageScore. The respective credit ratings of the pool of borrowers may be analyzed discretely or in composite fashion. However, because assets, such as mortgages, may be paid down beyond scheduled payments or paid off altogether, over time the overall composition, and concurrent risk, of the pool of borrowers changes and, thus, does the overall risk of the investment. The key is to properly analyze the data to determine whether the overall risk is greater, lesser or unchanged.

For example, a disproportionate number of borrowers with high credit ratings may pay off loans early, thus removing such high credit/low risk assets from the asset pool. However, while this exiting of high credit score assets might appear to suggest, due to a decrease in the weighted average FICO score (WA FICO), that the risk associated with the security is greater, the invention provides a new method to look more closely at the available data to make a more informed evaluation. For instance, even where the WA FICO may decrease over time, again such as due to early payoffs of loans, the stability of the structured product is a migratory pattern indicia that should be considered before changing the rating of the security. For instance, where the WA FICO has decreased, but the remaining borrowers have FICO scores that have remained constant or changed on average or individually little, then there is stability in the overall product as the ability of the borrowers to make payments, based on credit scores, remains the same. Therefore, the stability in the remaining assets offsets the lower WA FICO (or the risk is discounted) and the rating reflect this indicia of stability such as by staying unchanged.

However, where there is little exiting of assets from an asset pool and the WA FICO goes down due to appreciable decreases on average of FICO scores, then this suggests a negative instability and a weakening in the apparent ability of the borrowers to make their payments. This is a migratory pattern indicia that indicates a greater risk of default in the asset pool and that the rating should be adjusted downward accordingly. Over time this has the effect of diminishing the attractiveness of the security due to increased risks of defaults associated with the remaining borrowers with relatively lower credit ratings. It is the downward trend in this pool that is more pertinent to the overall creditworthiness of the pool. This has the effect of increasing the risk of the security and, if all else remains the same, rendering the security overrated given the change in conditions. Because the rating remains the same and the investors are not aware of the change in conditions and increased risk, there is uncertainty and a lack of confidence in the market. In addition, there may be positive instability indicia. For example, where a WA FICO score increases over time, this is a positive trend that indicates decreasing risks.

Another migratory pattern indicia is by regional segmentation, i.e., where a security asset pool consists of a disproportionate number (and value) of loans in regions (states, cities, regions, zip code, etc.—information taken from loan documentation) that have associated with them a recognized overall decrease in creditworthiness then the security should be viewed as having greater risk that the overall WA FICO might otherwise suggest. For instance, a city that has experienced a measurable decrease in FICO scores by its residents may indicate a widespread economic issue in that city. This trend may be used as a factor in determining an initial rating or a change in the rating over time as the trend becomes more established. However, where a security has only a small percentage of loans concerning properties in such areas and the individual FICO scores are high and remain stable, then this would be a counter-indicia of risk and would be taken into account by the inventive method to offset the other indicia of risk. This is a form of individual segmentation. Before, only WA FICO information was available to investors, with the increase in transparency and the access to greater information, the invention may be used to arrive at more informed decisions in making ratings and investments and therefore will lead to confidence in the markets.

In this manner, the present invention provides a way to flag migratory pattern indicia for further consideration. Such a flag may be triggered automatically by a computer program reviewing data associated with an asset pool, either original data or updated data. Once a migratory pattern indicia has been flagged, then the further analysis may be manual, semi-automated or fully automated and may cause further action that is either manual, automatic or semi-automatic. For instance, a computer program may analyze the data to identify a migratory pattern indicia, such as high number of exits from an asset and a lowering of the WA FICO over time. This may be communicated to an analyst who then looks more closely at the data to determine further migratory pattern indicia, such as the stability of the remaining borrowers in the asset pool. On the other hand, a computer model may be used to automatically act on the flagged indicia to determine whether the change in data represents greater or lesser risk in the security and/or whether a change in rating is warranted. Further, in implementing the present invention a numerical value may be assigned to weight migratory pattern indicia and/or give an overall numerical value of the changing pattern (s) of the asset pool. Depending on a client's model, more or less weighting may be assigned to the various and selected migratory pattern indicia for processing within an overall financial rating model.

Figure 5:
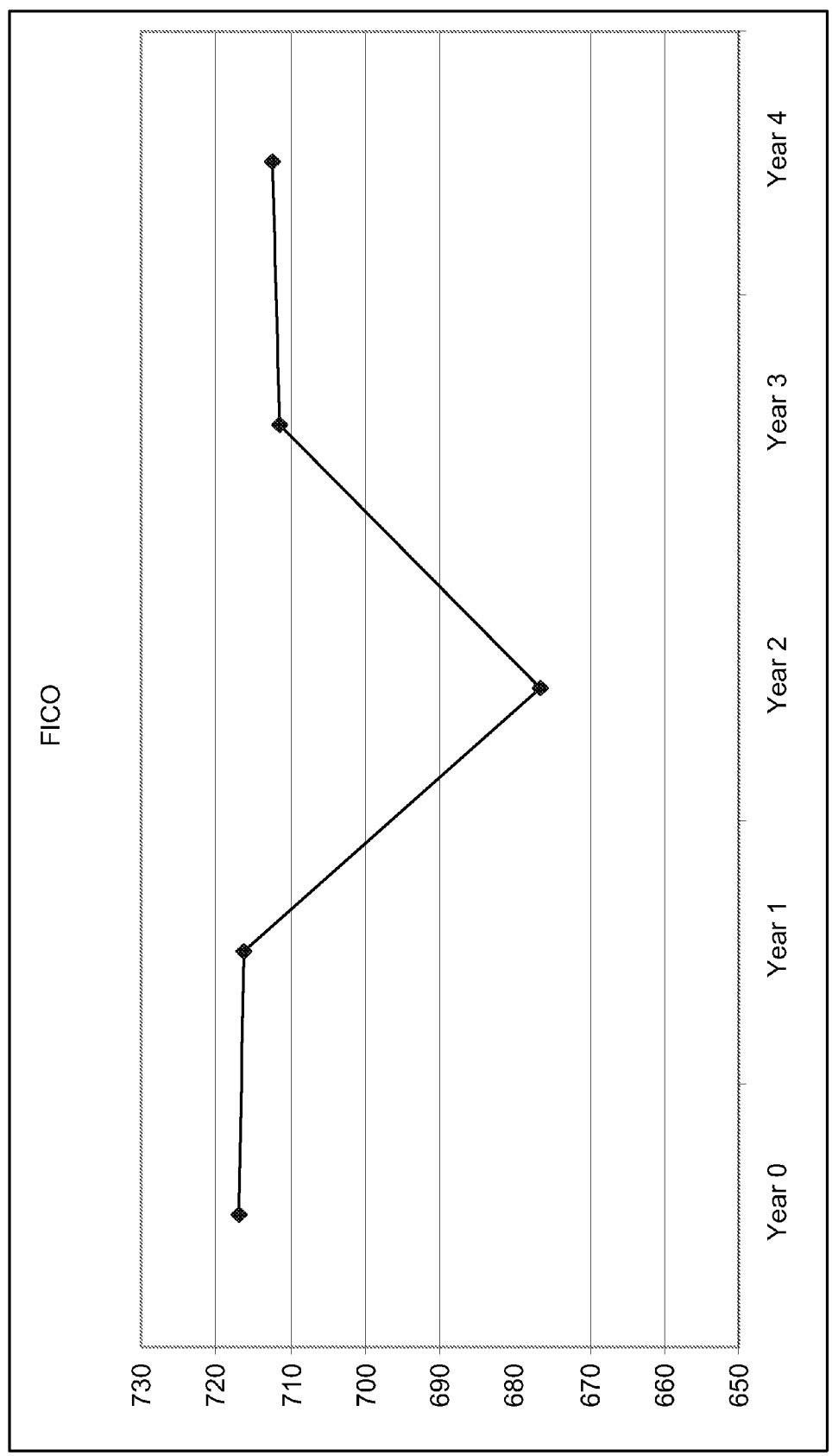
FIG. 5 is a composite FICO average score graph associated with one exemplary implementation of the present invention.

By analyzing the updated information to arrive at migratory patterns for determining predictive behavior as it relates to loan default, for example, the invention's use of such data patterns is much more valuable and powerful for predicting cash-flow disruptions than merely snapshots of updated information, although this too is useful to identify migratory pattern indicia. With reference to Table 1 below and FIG. 5, an exemplary analysis of migratory patterns is demonstrated using an example of an RMBS. A weighted average (WA) FICO migratory pattern segment is shown along with sample distribution of upgrades, downgrades and no changes in FICO scores across assets of the RMBS asset pool. Migration patterns may also be segmented by individual segmentation, regional segmentation (e.g., by state, by zip code), and loan type segmentation. In the example, WA FICO scores are shown respectively at origination and at yearly intervals one through four out from origination. As shown, the WA of FICO scores associated with asset pools drops from 750 at origination to 748 at year one, to 740 at year two, to 722 at year three, and finally to 690 at year four. The graph of FIG. 5 also illustrates a FICO distribution of a sample set of FICO data across an asset pool as it changes from origination (year zero) to year four.

Using only the WA FICO scores to determine relative risk and rating for a security, the Year Two drop from a WA FICO score of 748 to 740 might suggest an indication of greater risk in the security. However, the migratory pattern indicia of a high percentage (71%) of upgrades in FICO scores in the asset pool couple with a low percentage (4%) of downgrades and a strong (25%) percentage of unchanged gives a migratory pattern indicia of stability and strength. The indicia that the vast majority of borrowers in the pool have at least maintained their ability to make loan payments offsets the decrease of the WA FICO from 748 to 740 and the significant increase in creditworthiness across a large percentage (71%) of the borrowers is an indicia of strength in the security. Compare that with Year Three in which the WA FICO remains at a relatively high level 722 and would suggest, using only that indicator, a strong rating for the security and low risk. However, by analyzing the migratory pattern indicia of the asset pool one sees that a very high percentage of borrowers (92%) has experienced a downgrade in their individual FICO scores indicating a weaker creditworthiness on the majority of borrowers in the asset pool. Depending on the model configuration, this migratory pattern indicia will have a weighted effect on the determination to make a change in the security rating. It certainly indicates an increased risk of default and at least a trend in that direction. Looking now at Year Four, we see a much lower WA FICO score that on its own might cause a lowering of the rating of the security. Again depending on the model used, the migratory pattern indicia of a high percentage of borrowers (70%) with increasing or unchanging FICO scores indicates an increase in the stability, at lease from the previous Year Three, that may offset the effect assigned by the model to the decrease in the weighted average.

TABLE 1

| RMBS | Origination | Year One | Year Two | Year Three | Year Four |
|---|---|---|---|---|---|
| WA FICO ® | 750 | 748 | 740 | 722 | 690 |
| Upgrades | | 31% | 71% | 1% | 30% |
| Downgrades | | 29% | 4% | 92% | 30% |
| Unchanged | | 40% | 25% | 7% | 40% |

SADS tracks FICO scores of asset pool borrowers on an annual, semi-annual or other periodic basis. SADS tracks upgrades, downgrades in FICO scores as well as exits from the asset pool. SADS then may apply any of a variety of modeling techniques to determine predictive behavior of the asset pool. The predictive behavior may then be included, much as a feedback loop, into the predictive modeling or analysis to be applied to similar asset pools and/o similar structured products. These techniques can also take into account and be processed based on factors such as geographic region, state, zip code, etc., to arrive at a predictive behavior associated with that factor. The determined predictor may then be applied to other securities involving asset pools drawn largely from such factors or similarly situated security portfolios.

Take, for example, a comparison of two asset pools, Pool AAA and Pool BBB. Pool AAA is has WA FICO score of 754 at origination and 691 at year five, and Pool BBB similarly has WA FICO score of 752 at origination and 691 at year five. Pool AAA has a high percentage of downgrades over the term whereas Pool BBB has a high percentage of exits from the pool over the term. Both have default rates of less than 2%. Assuming that both pools experience a similar cash-flow history, evaluation and pricing and that both have similar WAC, WAM and WALA statistics, the migratory pattern-based predictive model reveals that Pool AAA has a much greater probability given default and cash-flow disruption.

Another aspect of the invention provides a Collateral and Credit Time Series for buy-side and sell-side clients, loan originators, rating agencies, GSEs, regulators, monoclines that provides better transparency to collateral and credit movements at the loan level. The Collateral and Credit Times Series is an innovative solution to track changes in overall asset valuation and credit scoring (individual or corporate). It provides better rolling data for market movements for seasoned deals and tracks loan level data.

SADS provides a CDO Intelligence (CDOi) component for buy-side and sell-side clients, loan originators, rating agencies, GSEs, regulators, and monolines who need greater transparency into their holdings or ratings. CDOi is a database that provides aggregate CDO data that will be visible from any point in the SID database.

SADS may be adapted to provide a single uniformed data repository that utilizes a standardized global FICO score and would give asset managers the ability to compare cross border instruments for investment analysis. In this manner, SADS provides a FICO score migration, as well as with any other individual credit measure associated in a pool migratory pattern, implementation providing the marketplace with greater transparency in the structured finance marketplace. Applying FICO migration in conjunction with other individual credit measures also provides improved calculation of Loss Given Default (LGD) in pools of loans.

By applying FICO migration patterns, SADS updates WA FICO scores for seasoned pools. This approach gives greater visibility and transparency in risk profiles to better assess the pricing of individual securities in MBS portfolios. The models used in pricing these securities assumed that home prices would increase allowing borrower to refinance their mortgages. As home prices have fallen dramatically there is a call for better transparency. SADS may apply an annual FICO score pattern for US RMBS Securities allowing for the following information to be available: updated WA FICO scores; migratory patterns available for loan pools in RMBS.

Figure 6:
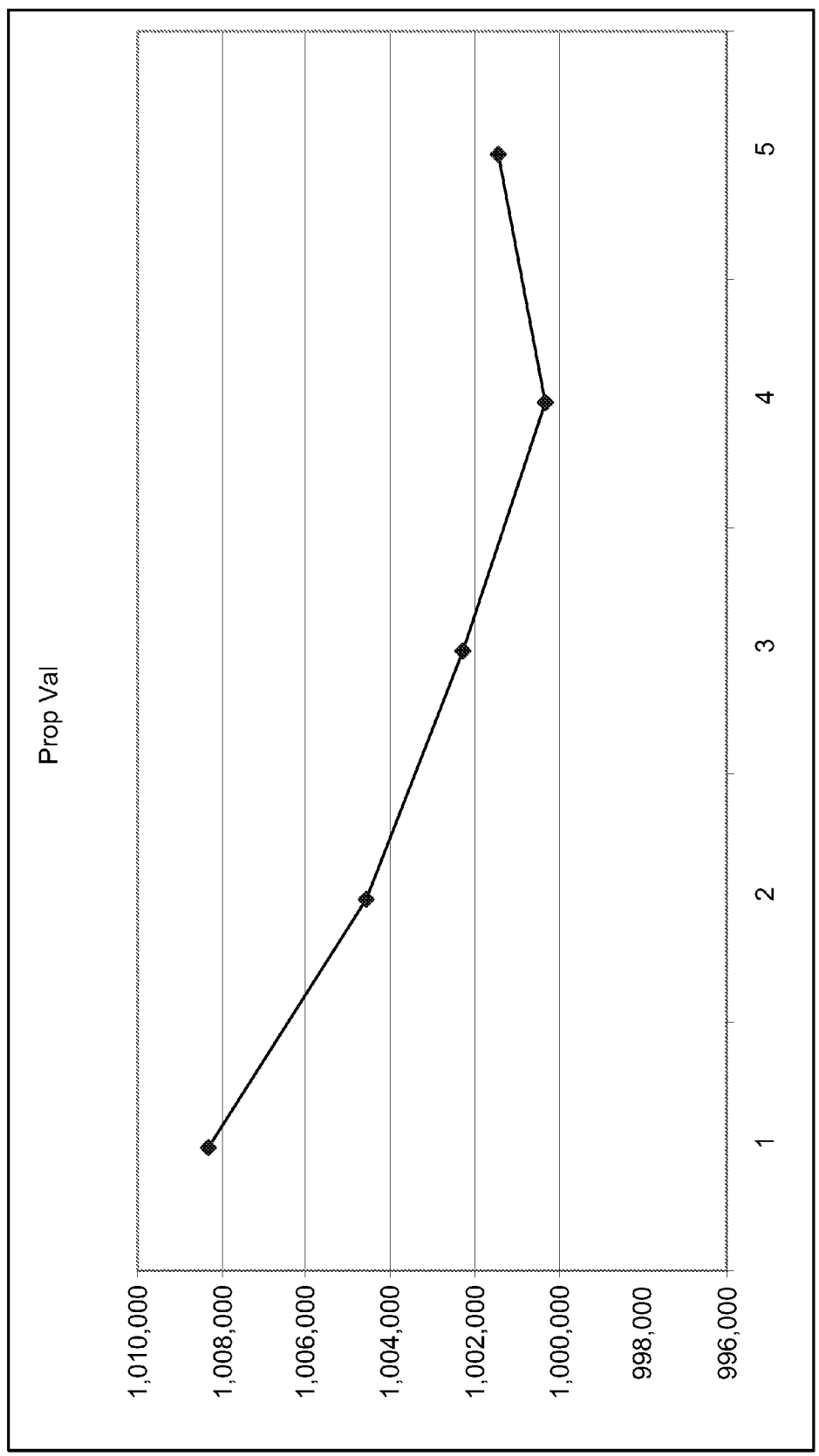
FIG. 6 is a composite property value graph associated with one exemplary implementation of the present invention.
Figure 7:
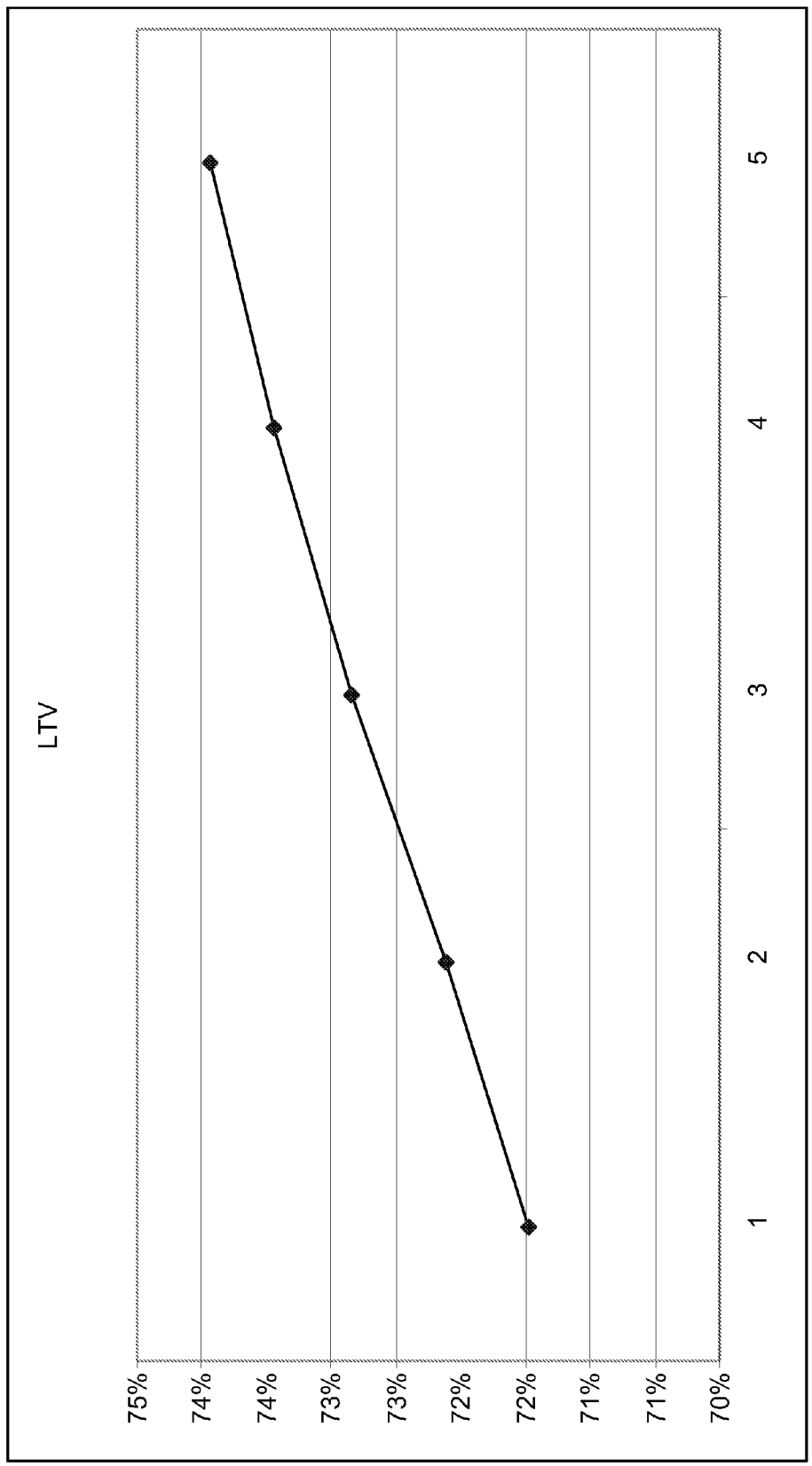
FIG. 7 is a composite inverse loan-to-value graph associated with one exemplary implementation of the present invention.

SADS may utilize the Fair Isaac processes to assess costs associated with FICO score migration acquisition and acquire updated FICO scores to create migration patterns. SADS may then integrate updated FICO scores and any other individual credit measure associated in a pool migratory pattern data in distributable database 138 along with housing historical data With reference to FIGS. 6 and 7, an additional migratory pattern indicia is pay downs on loans beyond scheduled payments, which are a positive indication of stability. Property values (PV) and loan-to-value (LTV) data may provide additional migratory pattern indicia. As PV goes up, LTV goes down and as PV goes down, LTV goes up. Only two ways LTV increases, either no payments toward principal are made, indicating greater likelihood of default, or property values go down faster that the principal is being paid down. Higher LTVs increase risk as a general notion as do data related to borrowers having HELOCs and/or second mortgages or other debt. Decreasing WA or individual LTVs is a positive, such as when extra pay downs on principal are made or the PV increases. However, in situations where PVs generally or regionally are declining, then the migratory pattern indicia showing stability or other positive indications may be used to offset or discount the negative aspect of a rising LTV. That is, where LTVs are increasing not due to failure of borrowers to make payments but rather due to a general decrease in PVs, then this may be factored into a financial rating model to determine the risk or rating of a security. For example, if at the time a loan is issued the PV is $100 with $20 down, then the LTV is 80%. If the PV subsequently drops to $80, then the LTV is 100%. Since the increase is not related to default on payments, a model may discount the negative aspect. However, if LTV gets too great, as in the example, then the borrower may be more included to default on the loan and the model may factor in greater risk. This is an example of a migratory pattern indicia being used in either a negative or a positive fashion depending on the model.

The present invention is not to be limited in scope by the specific embodiments described herein. It is fully contemplated that other various embodiments of and modifications to the present invention, in addition to those described herein, will become apparent to those of ordinary skill in the art from the foregoing description and drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

I claim:

1. A computerized method for evaluating risk in asset backed securities, the method comprising:

receiving by a processor a first data set associated with an asset pool of an asset backed security (ABS), the first data set including at least a set of actual data collected over a period of time and derived from the asset pool and credit score data related to the asset pool;

applying a migratory pattern predictive model to at least a part of the first data set, including the set of actual data and the credit score data, and based upon the application of the migratory pattern predictive model, determining by the processor a rating concerning a relative risk associated with the ABS.

2. The method of claim 1, wherein the first data set includes default data associated with the asset pool.

3. The method of claim 1, wherein the migratory pattern predictive model includes as a factor data related to an exiting of assets from an asset pool.

4. The method of claim 1, wherein the first data set includes data related to a exiting of assets from the asset pool.

5. The method of claim 1, further comprising the step of repeating the applying step on a periodic basis to generate an updated rating concerning a relative risk associated with the ABS.

6. The method of claim 1, wherein the first data set includes one or more of: Fair Isaac Corporation (FICO) score; VantageScore; weighted average maturity (WAM); weighted average coupon (WAC); weighted average loan age (WALA); upgrades; downgrades; and exits.

7. The method of claim 1, wherein the migratory pattern predictive model includes as a factor a stability factor related to a comparison of credit scores derived from the asset pool.

8. The method of claim 7, wherein the stability factor includes a payment history associated with the asset pool and includes changes in credit score related to the asset pool over a period of time.

9. A computer-based system for evaluating risk in asset backed securities (ABS) comprising:
a database containing data associated with an asset pool of an ABS;
a computer having a processor for executing software and being adapted to establish a communication link with an external provider of electronic data and to receive a first data set associated with an asset pool of an ABS, the first data set including at least a set of actual data collected over a period of time and derived from the asset pool and credit score data related to the asset pool; and
a migratory pattern predictive model application executed by the processor and adapted to analyze at least a part of the first data set, including the set of actual data and the credit score data, and to determine a rating concerning a relative risk associated with the ABS.

10. The system of claim 9, wherein the first data set includes default data associated with the asset pool.

11. The system of claim 9, wherein the migratory pattern predictive model application includes code that applies as a factor data related to a exiting of assets from an asset pool.

12. The system of claim 9, wherein the first data set includes data related to a exiting of assets from the asset pool.

13. The system of claim 9, wherein the migratory pattern predictive model application is applied on a periodic basis to successive updated data sets associated with the asset pool to generate updated ratings concerning a relative risk associated with the ABS.

14. The system of claim 9, wherein the first data set includes one or more of: Fair Isaac Corporation (FICO) score; VantageScore; weighted average maturity (WAM); weighted average coupon (WAC); weighted average loan age (WALA); upgrades; downgrades; and exits.

15. The system of claim 9, wherein the migratory pattern predictive model includes as a factor a stability factor related to a comparison of credit scores derived from the asset pool.

16. The method of claim 15, wherein the migratory pattern predictive model includes as a factor a stability factor related to a comparison of credit scores derived from the asset pool.

17. A computer-implemented method for evaluating risk over time in asset backed securities, the method comprising:
receiving by a processor a first data set associated with an asset pool of an asset backed security (ABS), the first data set the first data set including at least a set of actual data collected over a period of time and derived from the asset pool and credit score data related to the asset pool;
based at least in part on the first data set, determining by the processor a rating concerning a relative risk associated with the ABS and assigning a first score to the ABS at a first time;
storing in a memory the first score;
updating the first data set at a time subsequent to the first time;
applying a migratory pattern predictive model to at least a part of the updated first data set;
based upon the application of the migratory pattern predictive model, determining by the processor an updated rating concerning a relative risk associated with the ABS and assigning a second score to the ABS at a second time; and
storing in the memory the second score.

18. The method of claim 17, wherein the migratory pattern predictive model is based upon at least one factor selected from the group consisting of:
(a) a set of credit scores;
(b) a set of credit capacity indices;
(c) a set of loan-to-value (LTV) ratios;
(d) a set of information relating to home sales;
(e) a set of information relating to home foreclosures; and
(f) a set of information relating to home equity line of credits (HELOCs).

19. The method of claim 17 further comprising assigning a monetary value to the ABS based upon the second score.

20. The method of claim 17, wherein the migratory pattern predictive model includes as a factor a stability factor related to a comparison of credit scores derived from the asset pool.

21. The method of claim 20, wherein the migratory pattern predictive model includes as a factor a stability factor related to a comparison of credit scores derived from the asset pool.

* * * * *